(12) United States Patent
Jahn et al.

(10) Patent No.: US 7,780,216 B2
(45) Date of Patent: Aug. 24, 2010

(54) CONVERTIBLE TOP WITH A ROTATIONAL ANGLE DETECTION DEVICE

(75) Inventors: Jorg Jahn, Bünde (DE); Peter Gutendorf, Osnabrück (DE)

(73) Assignee: Wilhelm Karmann GmbH, Osnabrück (DE)

( * ) Notice: Subject to any disclaimer, the term of this patent is extended or adjusted under 35 U.S.C. 154(b) by 689 days.

(21) Appl. No.: 11/705,242

(22) Filed: Feb. 12, 2007

(65) Prior Publication Data
US 2007/0187980 A1  Aug. 16, 2007

(30) Foreign Application Priority Data
Feb. 14, 2006 (DE) .................. 10 2006 006 673

(51) Int. Cl.
*B60J 7/00* (2006.01)
(52) U.S. Cl. ............................. 296/107.09; 324/207.2
(58) Field of Classification Search ............ 296/107.09, 296/117, 107.01; 318/568.16; 324/207.2, 324/207.22
See application file for complete search history.

(56) References Cited

U.S. PATENT DOCUMENTS

| | | | |
|---|---|---|---|
| 4,555,120 A * | 11/1985 | Frait et al. ................. 280/6.158 |
| 4,643,508 A * | 2/1987 | Schaller ....................... 439/31 |
| 4,810,967 A * | 3/1989 | Yokoyama et al. ......... 324/207.2 |
| 5,198,740 A | 3/1993 | Jacobsen et al. |
| 5,225,747 A | 7/1993 | Helms et al. |
| 5,302,886 A | 4/1994 | Jacobsen et al. |
| 5,307,013 A * | 4/1994 | Santos et al. .............. 324/207.2 |
| 5,394,070 A * | 2/1995 | Jacobsen et al. ......... 318/568.16 |
| 5,457,368 A | 10/1995 | Jacobsen et al. |
| 5,557,185 A | 9/1996 | Jacobsen et al. |
| 5,621,317 A * | 4/1997 | Wozniak ................. 324/207.13 |
| 5,621,318 A | 4/1997 | Jacobsen et al. |
| 6,253,630 B1 * | 7/2001 | Hacker ...................... 73/865.9 |
| 6,415,677 B1 | 7/2002 | Skogward |
| 6,601,907 B2 * | 8/2003 | Gutendorf et al. ....... 296/107.09 |
| 6,863,334 B2 | 3/2005 | Dangl et al. |
| 7,214,067 B2 * | 5/2007 | Zaderej ........................ 439/31 |

* cited by examiner

*Primary Examiner*—Kiran B. Patel
(74) *Attorney, Agent, or Firm*—J-TEK Law PLLC; Jeffrey D. Tekamic

(57) ABSTRACT

A folding convertible top for a convertible vehicle includes a rotational angle detection device disposed in a rotary hinge (1) for detection of the rotational angle between linkage arms (2, 4) of a convertible top frame that are pivotably connected with each other by a bearing pin (10; 22). A rotational angle encoder (8; 18; 30) is connected with one linkage arm so as to rotate therewith and a sensor element (6; 20; 32) is connected with the other linkage arm so as to rotate therewith. The rotational angle encoder and/or the sensor element is/are disposed adjacent to the bearing pin on respective surfaces of the linkage arms facing towards each other or within housing parts (24, 26) connected to the respective linkage arms.

15 Claims, 3 Drawing Sheets

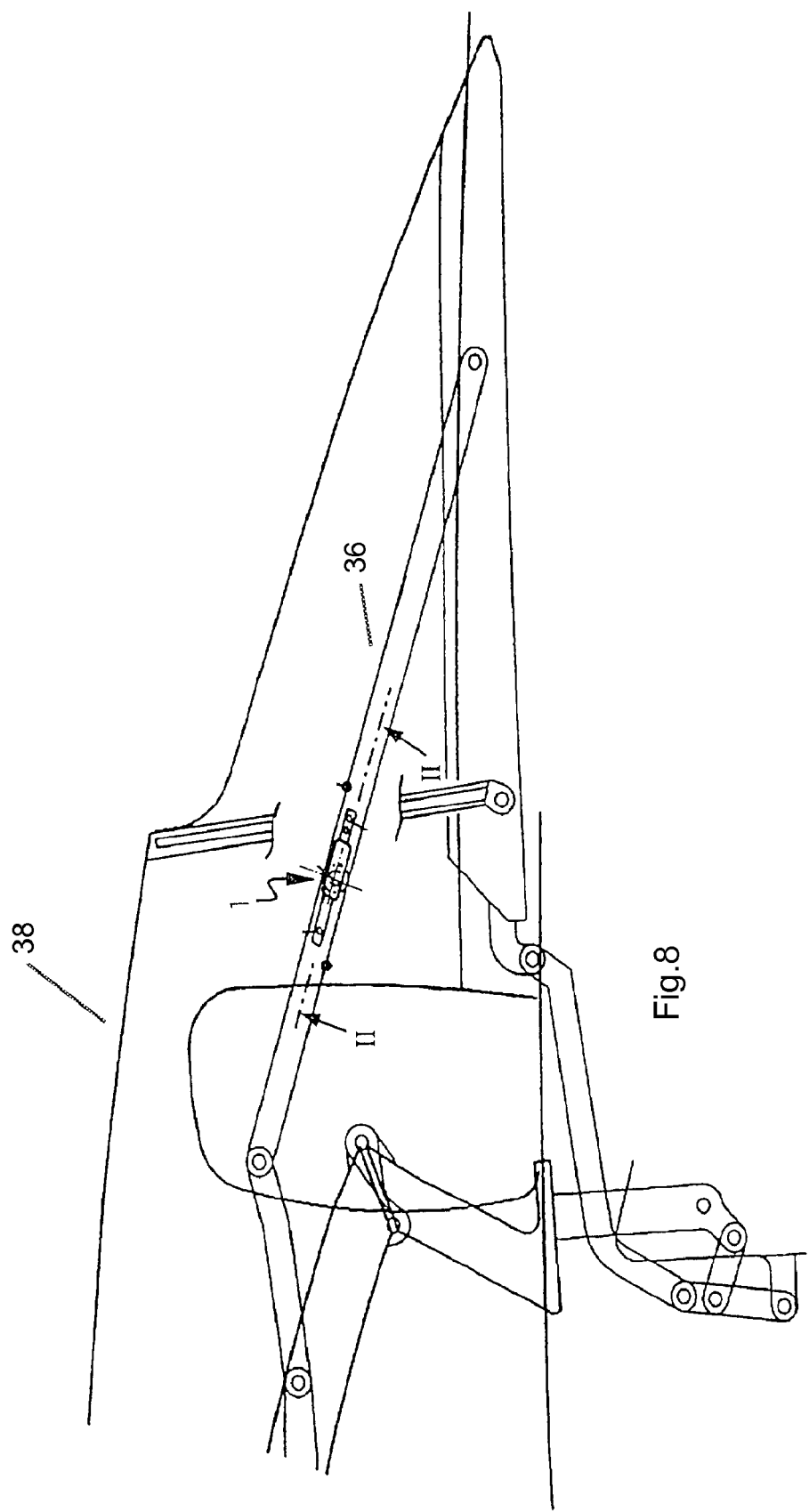

CONVERTIBLE TOP WITH A ROTATIONAL ANGLE DETECTION DEVICE

CROSS-REFERENCE

Priority to German patent application no. 10 2006 006 673.1 filed Feb. 14, 2006 is claimed, the contents of which are incorporated herein by reference in its entirety.

TECHNICAL FIELD

The invention concerns a convertible top for a convertible automobile that includes a rotational angle detection device for at least one rotary hinge (pivot point) in the linkage/frame assembly of the folding convertible top.

BACKGROUND ART

U.S. Pat. No. 5,225,747 describes a rotational angle detection device that measures the momentary angular position of a rotary hinge and supplies the measured data to a control unit. The rotational angle is detected by a potentiometer that is affixed substantially laterally adjacent to the rotary hinge in a sealed housing. By arranging the potentiometer coaxial to the rotational axis, the connection of the linkage arms is possible only with increased complexity due to the coaxial shaft of the potentiometer. By laterally arranging the potentiometer adjacent to the rotary hinge, additional installation space is required, whereby the design possibilities for arranging the movable parts of the convertible top mechanism are restricted.

SUMMARY OF THE INVENTION

It is an object of the present invention to provide a folding convertible top having at least one simple-to-construct rotational angle detection device that requires minimal space.

In one aspect of the present teachings, the rotational angle detection device is arranged and constructed to detect the rotational angle between linkage or frame arms of a convertible top. The linkage or frame arms are connected with each other and are pivotable about a rotational axis, thereby forming a rotary hinge. Such rotary hinges may also be referred to as pivot joints and/or swivel joints/hinges.

A rotational angle encoder is preferably connected with one linkage arm so as to rotate therewith and a sensor element is preferably connected with the other linkage arm so as to rotate therewith. Further, the rotational angle encoder and the sensor element are preferably disposed adjacent to the rotational axis and on or proximal to inner surfaces of the linkage arms that face towards each other. These inner surfaces optionally may be a part of the rotary hinge.

In addition or in the alternative, the rotary hinge may comprise a first housing part rotatably or pivotably coupled to a second housing part. The first and second housing parts are preferably coupled to the first and second linkage arms, respectively, so as to rotate therewith. For example, the first and second housing parts may be attached to end portions of the respective linkage arms. In addition, the rotational angle encoder may be disposed within the first or second housing part and the sensor element may be disposed in the other housing part. In such an embodiment, the rotational angle encoder and/or the sensor element are advantageously protected from damage and contamination while also minimizing overall space requirements for the rotational angle detection device.

Alternatively, the rotational angle encoder and/or the sensor element may be accommodated in a recess of the surfaces facing towards each other.

In addition or in the alternative, a bearing bush may be disposed about a bearing pin that forms the rotational axis of the rotary hinge. The bearing bush may penetrate or extend through one of the two linkage arms. In this case, the shaft length of the bearing pin preferably substantially corresponds at least to the thickness of the portion of the linkage arm that surrounds the bearing pin.

In another aspect of the present teachings, a spacer washer may be disposed between the linkage arms. In such an embodiment, the thickness of the spacer washer is preferably at least as thick as the height required by the rotational angle encoder and/or the sensor element between the two facing surfaces of the linkage arms or the rotary hinge.

In another aspect of the present teachings, the linkage arms may be pivotably or rotatably connected to each other by a rivet, a screw, a bolt or another such fastening means that permits the linkage arms or rotary hinge parts to rotate relative to each other.

In another aspect of the present teachings, the rotational angle may be detected either by contact between the rotational angle encoder and the sensor element or by a contact-less arrangement.

In another aspect of the present teachings, the rotational angle encoder and/or the sensor element are accommodated in a housing part attached to the end portion of at least one of the linkage arms, which housing part may optionally form a part of the rotary hinge.

In general, the present teachings provide a simple, inexpensive and reliable possibility for ascertaining the relative rotational or angular position of linkage arms, e.g. of a folding convertible top, wherein the installation space required by the device is small and the connection of the linkage arms, which form a rotary hinge, is realizable in a simple manner.

BRIEF DESCRIPTION OF THE DRAWINGS

In the following, the invention will be described in an exemplary manner with the assistance of schematic figures of representative linkage or frame assemblies of a folding convertible top for a convertible vehicle, in which:

FIG. 8 shows a side view of a convertible top of a convertible vehicle.

DETAILED DESCRIPTION OF THE INVENTION

In the following description, three preferred embodiments of a rotary hinge 1 constructed from and pivotably connecting two linkage arms 2 and 4 will be described in an exemplary manner. The invention is limited neither to the number of linkage arms nor to detailed embodiments described herein. Furthermore, the invention is not limited to rotary hinges for folding convertible tops, as the present invention will find application in a variety of fields for which determination of the rotational angle of a rotary hinge is desirable.

It is expressly noted that each of the additional features and teachings disclosed above and below may be utilized separately or in conjunction with other features and teachings to provide improved convertible tops and rotational angle detection devices and methods for designing and using such convertible tops and rotational angle detection devices.

Representative examples of the present invention, which examples utilize many of these additional features and teachings both separately and in conjunction, will now be described in further detail with reference to the attached drawings. This detailed description is merely intended to teach a person of skill in the art further details for practicing preferred aspects of the present teachings and is not intended to limit the scope of the invention. Moreover, combinations of features and steps disclosed in the following detail description may not be necessary to practice the invention in the broadest sense, and are instead taught merely to particularly describe representative examples of the invention.

Further, various features of the representative examples and the dependent claims may be combined in ways that are not specifically and explicitly enumerated in order to provide additional useful embodiments of the present teachings. All features disclosed in the description and/or the claims are intended to be disclosed separately and independently from each other for the purpose of original written disclosure, as well as for the purpose of restricting the claimed subject matter independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
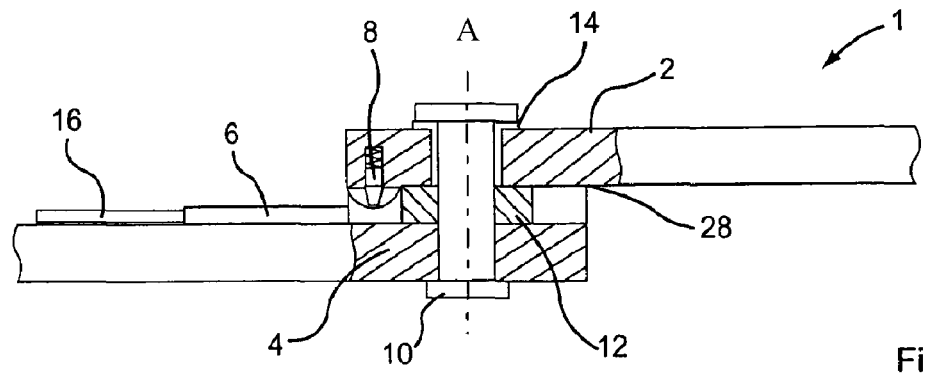
FIG. 1 shows a schematic cross-sectional illustration of a representative rotary hinge for a convertible top frame having a film potentiometer serving as a rotational angle detection device.

In a first representative embodiment of the present teachings, the rotary hinge 1 illustrated in FIG. 1 in its extended condition includes a film or foil potentiometer 6 affixed, e.g., by means of adhesive, to linkage arm 4 so as to be disposed between the two linkage arms 2 and 4; the film potentiometer 6 is connected with, e.g., a control device (not illustrated) via the conductive path (e.g., wires) 16. A recess can be provided in the linkage arm 4 for accommodating or receiving the film potentiometer 6, which forms a sensor element 6, so that the upper surfaces of the sensor element 6 and the linkage arm 4 that face the linkage arm 2 are, e.g., flush.

Representative film potentiometers 6 suitable for use with the present teachings are sold by Altmann GmbH of Herford, Germany under "AFP-Folienpotentiometer," e.g., "AFP-R."

A pressure- and/or mounted point 8, which is elastically biased and in contact with the film potentiometer 6, is accommodated in the linkage arm 2 parallel to the rotational axis A of the rotary hinge 1; the mounted point 8 deforms the support surface of the film potentiometer 6 that is facing the linkage arm 2 and thus effects a conductive contact within the film potentiometer 6. The position of the thus-produced contact on the film potentiometer 6 depends upon the angular position of the linkage arms 2 and 4, so that the rotational position of the linkage arms 2 and 4 relative to each other can be ascertained from the resistance of the film potentiometer 6. The mounted point 8 thus forms a rotational angle encoder 8, whose relative position to the film potentiometer 6 can be continuously monitored by a control unit (not illustrated) connected to the three wire conductive path 16 in the illustrated example. The measurement range preferably amounts to, for example, approximately 360°.

The rotary hinge 1 is held together, e.g., by means of a rivet 10 that forms a bearing pin of the rotary hinge 1. The clearance necessary for accommodating the film potentiometer 6 between the two linkage arms 2 and 4 is adjusted or set by a spacer washer 12 and a bearing bush 14, so that the two linkage arms 2 and 4 can move relative to each other substantially free of play. In this connection, the height in the rotational axis direction of the spacer washer 12 is selected so that it corresponds at least to the amount by which the film potentiometer 6 projects above the surface of the linkage arm 4 that faces the linkage arm 2. The axial length of the bearing bush 14, which ends in a flange projecting above the linkage arm 2 and is supported on the spacer washer 12, is preferably slightly longer than the thickness of the linkage arm 2.

The spacer washer 12, whose radially-directed surfaces are advantageously coated with a lubricant, can be designed as one-piece with the bearing bush 14.

In order to make the potentiometer 6 easily exchangeable or removable in case it is necessary to repair or replace the potentiometer 6, a screw 22 can also be provided instead of the rivet 10. In this case, the linkage part 4 preferably includes a corresponding thread for receiving the screw 22 (see FIG. 4 and 7).

The described rotational angle detection device can be integrated as a whole into the rotary hinge 1 in a simple way, wherein the conductive path 16 merely leads to the exterior for connection to a controller, microprocessor, signal evaluation unit, etc.

Figure 3:
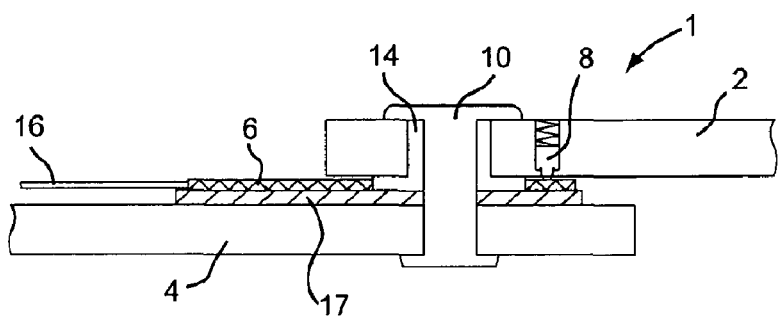
FIG. 3 shows a view similar to FIG. 1 of a modified embodiment.

FIG. 3 shows an embodiment of a rotary hinge 1 that has been modified as compared to FIG. 1. Corresponding parts have been identified with the same reference numerals and only the modifications will be described.

According the embodiment of FIG. 3, the film potentiometer 6 abuts or is affixed to a base plate 17, e.g. made of metal or plastic, which can be commonly utilized for a variety of rotary hinges and can include a recess for accommodating or receiving the film potentiometer 6. The bearing bush 14 is preferably supported on the base plate 17 and the lower end of the bearing bush 14 is preferably designed with a collar or flange.

The linkage arm 2 is held between the collar of the bearing bush 14 and the head of the rivet 10. Tilting forces are also absorbed by this arrangement.

The mounted point 8 can be accommodated in its own assembly, e.g. in a sleeve or bushing, that is installed in, e.g., screwed into, the linkage arm 2.

Figure 2:
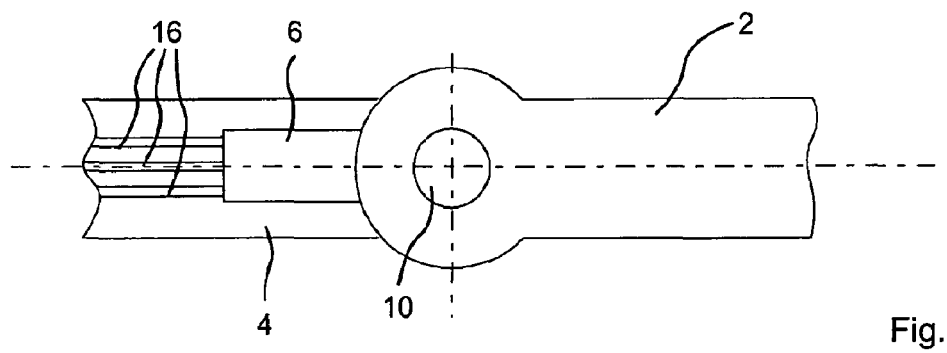
FIG. 2 shows a schematic top view of the rotary hinge of FIG. 1.

FIGS. 1 to 3 show representative examples of the use of a film potentiometer 6 that can be modified in various ways without departing from the basic concept of the present teachings, i.e. to dispose the film potentiometer for rotational angle detection between the linkage arms, wherein the film potentiometer can be installed with the mounted point in different linkages or frames without requiring substantial additional installation space. If the film potentiometer 6 is sinked into a recess of the linkage arm 4, no additional installation space will also be required in the axial direction.

With the embodiments according to FIGS. 1-3, detection of the rotational angle has been described in an exemplary manner for a rotational angle encoder 8 that contacts the sensor unit 6. However, other arrangements operating with mechanical contacts are also conceivable and the present teachings are not limited in this regard.

In addition, representative embodiments of the rotary hinge according to the present teachings can operate with contact-less systems, such as e.g., with inductive, magnetic or optical rotational angle sensors. In the following, two preferred embodiments with contact-less rotational angle sensors will be described, wherein one operates with an inductive system and the other operates with a magnetic system constructed based upon the Hall effect.

Figure 4:
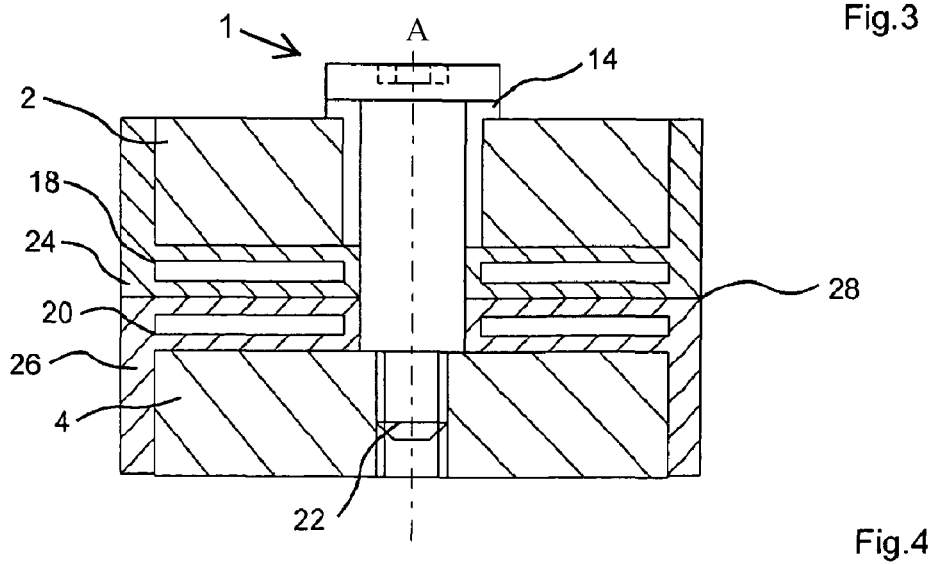
FIG. 4 shows a schematic cross-sectional illustration of a representative embodiment of a rotary hinge having a contact-less inductive system serving as a rotational angle detection device.
Figures 5, 6:
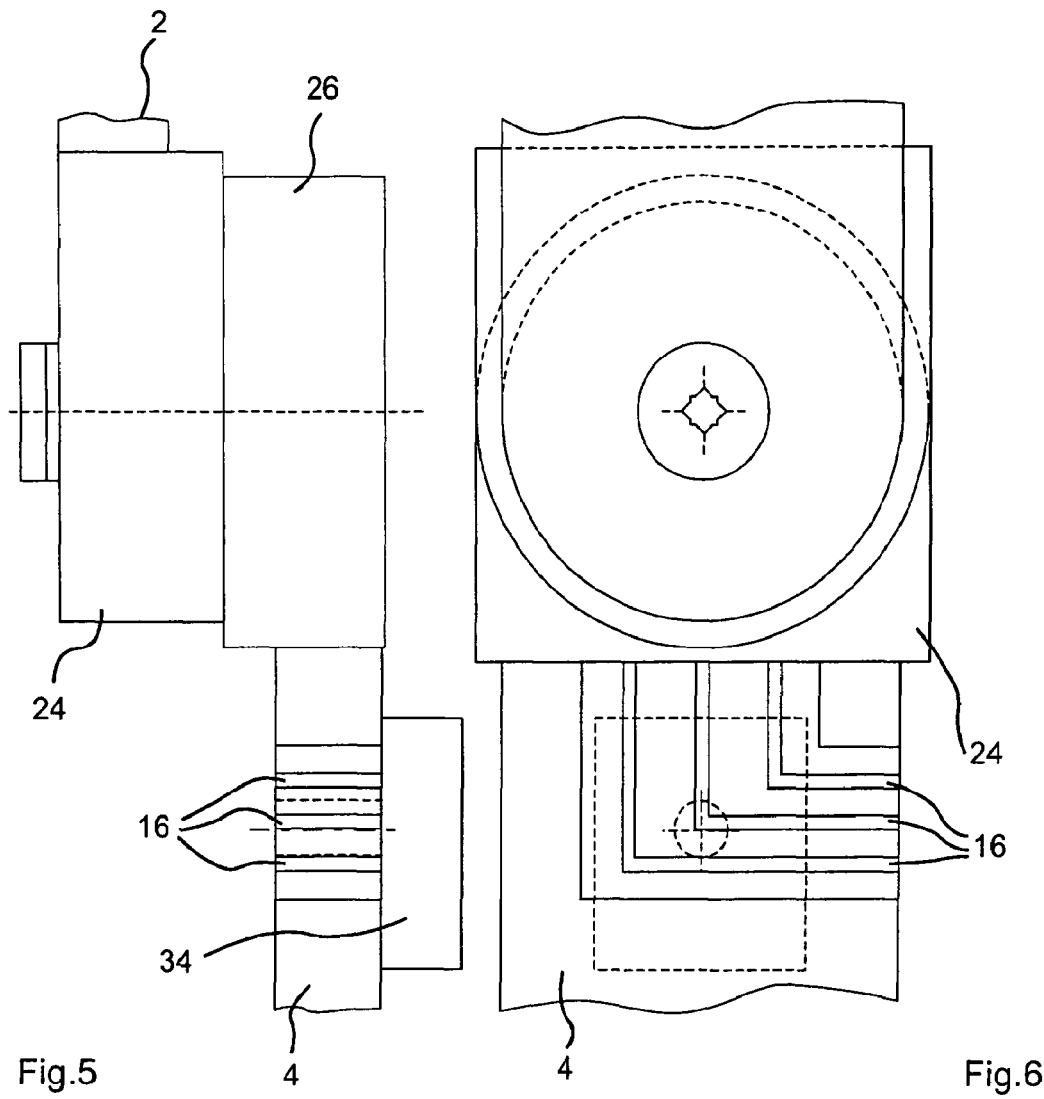
FIG. 5 shows a schematic side view of the rotary hinge of FIG. 4.
FIG. 6 shows a schematic top view of the rotary hinge of FIG. 4.

In FIGS. 4-6, the inductive embodiment example is illustrated, which includes a rotational angle encoder 18 designed as a flat magnet and an inductive sensor element 20, which is designed as a thin conductive plate. When the rotational angle encoder 18 rotates relative to the sensor unit 20, current flow through the sensor unit 20 changes, so that the rotational position of the first linkage arm 2 relative to the second linkage arm 4 can be ascertained. The power supply to and the signal output from the sensor unit 20 takes place via conductive paths (e.g., wires) 16 that are electrically connected with a connector plug 34 for connection to a controller, microprocessor, signal evaluation unit, etc.

The rotational angle encoder 18 and the sensor element 20 are each preferably embedded or disposed in a housing part 24, 26, respectively, so that they are protected from contamination and damage. In addition, the housing parts 24, 26 can be designed so as to shield exterior noise from the rotational angle encoder 18 and the sensor element 20. Moreover, the encoder 18 and the sensor element 20 are preferably held at an optimal axial separation.

The housing parts 24 and 26 can be attached to the ends of the linkage arms 2 and 4 in a simple manner and thus form the respective slide (contact) surfaces 28 of the rotary hinge 1.

Furthermore, the housing parts 24 and 26 are preferably designed such that the bearing bush 14 can be directly supported on the housing parts 24 and 26. The shaft length of the bearing bush 14 is selected, e.g., so that it corresponds to the thickness of the linkage arm 2, wherein the screw 22 connecting the linkage arms 2, 4 preferably includes a shoulder or step that has a separation or distance from the bottom side of the screw head equal to, or substantially equal to, the sum of the thickness of the linkage arm 2 and the thickness of the two housing parts 24 and 26. In this case, the two housing parts 24 and 26 are not pressed against each other by the screw 22 when the rotary hinge 1 is connected, so that the rotary hinge 1 operates with minimal friction and the components in the housing parts 24 and 26 are not damaged.

In the alternative, the bearing bush 14 also can be shaped so that its shaft penetrates through the two housing parts 24, 26 and is supported on the linkage arm 4. In this case, the shaft length of the bearing bush 14 is approximately equal to the sum of the thickness of the linkage arm 2 and the housing parts 24 and 26.

Figure 7:
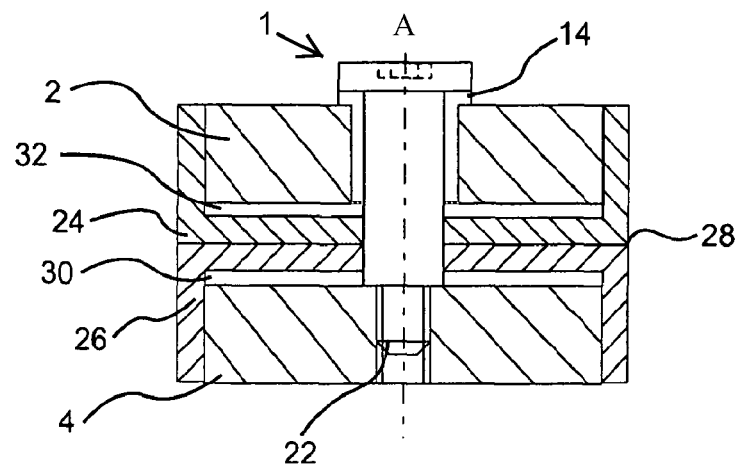
FIG. 7 shows a schematic cross-sectional illustration of a further representative embodiment of a rotary hinge with a contact-less magnetic system serving as a rotational angle detection device.

In FIG. 7, a further variant of a contact-less rotational angle detection device is illustrated that includes a magnet 32 as the rotational angle encoder and a Hall-element 30 as the sensor element. In this case, the rotational angle encoder 32 and the sensor element 30 are installed in the housing parts 24 and 26, respectively, such that they are preferably disposed on the surfaces (e.g., inner surfaces) of the housing parts 24 and 26 facing away from the slide surfaces 28. Naturally, the rotational angle encoder 32 and the sensor element 30 also may be embedded in the respective slide surfaces 28 of the housing parts 24, 26 or directly in end portions of the linkage arms 2, 4. In this regard, any arrangement that protects the rotational angle encoder 32 and sensor element 30 from damage and contamination without requiring any (or significant additional) space falls within the scope of the present teachings. Thus, for example, the rotational angle encoder 32 and the sensor element 30 may also be disposed within hollow portions of respective parts that define the rotary hinge 1.

The further construction of the embodiment illustrated in FIG. 7 corresponds to the embodiment of FIG. 4 and thus, further explanation of the embodiment of FIG. 7 is not necessary.

As is illustrated in FIGS. 4 and 7, the rotary hinge 1 can also be held together by using a screw and/or a bolt 22 instead of the rivet 10. In this case, the necessary distance or separation for the assembly of the rotational angle encoder 18, 32 and the sensor element 20, 30 can be ensured, e.g., by the thread-less portion of the shaft of the screw 22 and/or by the bearing bush 14.

In case the present teachings are applied to an optical device, one linkage arm 2, 4 preferably includes an optically-detectable pattern that indicates various angular positions of the linkage arms 2, 4. The other linkage arm 2, 4 preferably includes an optical detector or sensor capable of detecting the optically-detectable pattern.

The features of the described embodiments can be modified in various ways and can be combined with each other. For example, the rotational angle encoder is not required to be a permanent magnet. It can be formed by an inductive resistor that variably influences the current flow induced via wires by the sensor circuit for each respective rotational position.

Moreover, it is not necessary that the rotational angle signal information is evaluated or processed exterior to the rotary hinge 1, as processing or evaluation means (e.g. a microprocessor or state machine) may be incorporated into the rotary hinge 1 in order to locally ascertain the rotational angle between the linkage arms 2, 4.

Furthermore, the rotational angle detection devices can be integrated into existing linkage bearings in a simple way, so that it is possible to utilize and install a common rotational angle detection device in different linkage assemblies for different convertible top design and to adapt each one to the differing requirements of the various convertible tops simply by programming a control device, microprocessor, signal evaluation unit, etc.

For example, the present teachings can be applied to the convertible top of U.S. Pat. No. 6,601,907, the contents of which are incorporated by reference herein in its entirety, to replace the rotational angle detection device disclosed therein. Additional teachings concerning foldable convertible tops that are readily combinable with the present invention include, but are not limited to, U.S. Pat. Nos. 7,150,481, 7,140,666, 7,134,708, 7,118,161, 7,014,246, 6,902,223 and 6,886,888, all of which are incorporated by reference herein in their entireties.

As one specific example thereof, FIG. 8 shows a side view of a representative convertible top of a convertible vehicle that comprises a rotary hinge 1 according to the present teachings, which pivotably couples linkage arms II of a foldable frame 36 that supports a foldable top 38.

| REFERENCE NUMBER LIST | |
| --- | --- |
| 1 | Rotary hinge |
| 2 | Linkage arm |
| 4 | Linkage arm |
| 6 | Film potentiometer |
| 8 | Mounted point |

-continued

| REFERENCE NUMBER LIST | |
| --- | --- |
| 10 | Rivet |
| 12 | Spacer washer |
| 14 | Bearing bush |
| 16 | Conductive path |
| 17 | Base plate |
| 18 | Rotational angle encoder |
| 20 | Sensor element |
| 22 | Screw |
| 24 | Housing part |
| 26 | Housing part |
| 28 | Slide surface |
| 30 | Sensor element (Hall element) |
| 32 | Rotational angle encoder (magnet) |
| 34 | Connector plug |
| 36 | Foldable frame |
| 38 | Foldable top |
| A | Rotational axis |

The invention claimed is:

1. A foldable frame for supporting a convertible top, comprising:
   at least first and second linkage arms pivotably coupled at a rotary hinge defining a rotational axis of the first and second linkage arms,
   a rotational angle encoder fixedly coupled with the first linkage arm adjacent to the rotational axis, the rotational angle encoder being disposed on an inner-facing surface of, or within, at least one of the rotary hinge and the first linkage arm and
   a sensor element fixedly coupled with the second linkage arm adjacent to the rotational axis, the sensor element being disposed on an inner-facing surface of, or within, at least one of the rotary hinge and the second linkage arm, wherein the rotational angle encoder and the sensor element are arranged and constructed to generate a signal representative of the angular position of the first linkage arm relative to the second linkage arm.

2. The foldable frame according to claim 1, wherein at least one of the rotational angle encoder and the sensor element is accommodated in a recess defined in at least one of the surfaces of the linkage arms and the rotary hinge that face towards each other.

3. The foldable frame according to claim 1, further comprising:
   a bearing bush extending through at least one of the first and second linkage arms and surrounding a bearing pin defining the rotational axis of the rotary hinge, the bearing pin having a shaft length corresponding at least to the thickness of at least one linkage arm that surrounds the bearing pin.

4. The foldable frame according to claim 1, wherein the linkage arms are pivotably connected to each other by one of a rivet, a screw and a bolt.

5. The foldable frame according to claim 1, wherein the rotational angle encoder contacts the sensor element.

6. The foldable frame according to claim 1, wherein the rotational angle encoder is arranged and constructed not to contact the sensor element during detection of the rotational angle.

7. The foldable frame according to claim 1, wherein the sensor element is accommodated within a housing part attached to an end portion of one of the first and second linkage arms, which housing part at least partially defines the rotary hinge.

8. The foldable frame according to claim 1, wherein the sensor element comprises a film potentiometer and the rotational angle encoder comprises a mounted pin in contact with the film potentiometer.

9. The foldable frame according to claim 1, wherein the rotational angle encoder comprises a magnet and the sensor element is an inductive sensor element.

10. The foldable frame according to claim 1, wherein the rotational angle encoder comprises a magnet and the sensor element is a Hall element.

11. The foldable frame according to claim 10, wherein the Hall element is accommodated within a housing part attached to an end portion of one of the first and second linkage arms, the housing part at least partially defining the rotary hinge.

12. The foldable frame according to claim 11, further comprising:
   a bearing bush extending through at least one of the first and second linkage arms and surrounding a bearing pin defining the rotational axis of the rotary hinge, the bearing pin having a shaft length corresponding at least to the thickness of at least one linkage arm that surrounds the bearing pin.

13. The foldable frame according to claim 3, further comprising a spacer washer disposed between the first and second linkage arms, the spacer washer having a thickness that is at least as thick as the height required by at least one of the rotational angle encoder and the sensor element disposed between the two facing surfaces of the linkage arms.

14. A convertible top for a convertible vehicle, comprising:
   the foldable frame according to claim 12, and
   a foldable top supported by the foldable frame.

15. A convertible top for a convertible vehicle, comprising:
   the foldable frame according to claim 1, and
   a foldable top supported by the foldable frame.

* * * * *